(12) United States Patent
Kaufer et al.

(10) Patent No.: US 9,002,533 B2
(45) Date of Patent: Apr. 7, 2015

(54) MESSAGE TRANSMISSION CONTROL SYSTEMS AND METHODS

(75) Inventors: Matthew Leonard Kaufer, Holly, MI (US); Patrick L. Risse, Howell, MI (US); Thomas A. Crites, Okemos, MI (US)

(73) Assignee: GM Global Technology Operations, Detroit, MI (US)

( * ) Notice: Subject to any disclaimer, the term of this patent is extended or adjusted under 35 U.S.C. 154(b) by 741 days.

(21) Appl. No.: 13/232,269

(22) Filed: Sep. 14, 2011

(65) Prior Publication Data

US 2013/0006441 A1 Jan. 3, 2013

Related U.S. Application Data

(60) Provisional application No. 61/501,973, filed on Jun. 28, 2011.

(51) Int. Cl.
*H04L 29/04* (2006.01)
*H04L 12/403* (2006.01)
*H04L 12/865* (2013.01)
*H04L 12/40* (2006.01)

(52) U.S. Cl.
CPC .......... *H04L 12/403* (2013.01); *H04L 47/6275* (2013.01); *H04L 12/40143* (2013.01)

(58) Field of Classification Search
USPC .............................................................. 701/1
See application file for complete search history.

(56) References Cited

U.S. PATENT DOCUMENTS

| | | | | |
|---|---|---|---|---|
| 4,881,163 A * | 11/1989 | Thomas et al. | ................. | 710/56 |
| 7,606,154 B1 * | 10/2009 | Lee | ............................. | 370/232 |
| 7,895,273 B1 * | 2/2011 | Haldar | ........................ | 709/206 |
| 2005/0198155 A1 * | 9/2005 | Zakharoff | .................... | 709/206 |
| 2006/0106960 A1 * | 5/2006 | Hickson et al. | .................. | 710/52 |
| 2007/0147422 A1 * | 6/2007 | Urano et al. | ................. | 370/468 |
| 2008/0101393 A1 * | 5/2008 | Noumi et al. | ................ | 370/401 |
| 2009/0161547 A1 * | 6/2009 | Riddle et al. | ................. | 370/236 |
| 2010/0217811 A1 * | 8/2010 | Kay | ............................ | 709/206 |
| 2011/0125947 A1 * | 5/2011 | Dodson et al. | ............... | 710/112 |

FOREIGN PATENT DOCUMENTS

CN 101394405 A * 3/2009
CN 102195885 A * 9/2011

OTHER PUBLICATIONS

Office Action dated Oct. 22, 2014, from the German Patent Office for German Patent Application No. 10 2012 210 722.3; 6 pages.

* cited by examiner

*Primary Examiner* — Shelley Chen

(57) ABSTRACT

A message generation module generates a message that is to be transmitted to a serial data bus of the vehicle once per first predetermined period. A queue manager module resets a timer value when the message is added to a transmit queue and selectively adds the message to the transmit queue when: a number of messages in the transmit queue is less than a first predetermined value; the timer value is greater than the first predetermined period; and one of (i) the first predetermined period is less than a second predetermined period and (ii) the first predetermined period is greater than the second predetermined period and the number of messages in the transmit queue is less than a second predetermined value. The second predetermined value is less than the first predetermined value. A communication control module selectively transmits messages from the transmit queue to the serial data bus.

20 Claims, 3 Drawing Sheets

MESSAGE TRANSMISSION CONTROL SYSTEMS AND METHODS

CROSS-REFERENCE TO RELATED APPLICATIONS

This application claims the benefit of U.S. Provisional Application No. 61/501,973, filed on Jun. 28, 2011. The disclosure of the above application is incorporated herein by reference in its entirety.

FIELD

The present disclosure relates to vehicle communications and more particularly to message transmission control systems and methods for vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle includes various control modules that control various vehicle systems, respectively. For example only, an engine control module (ECM) controls an engine system of the vehicle, a transmission control module (TCM) controls a transmission system of the vehicle, etc.

A first control module may receive a signal from a sensor while a second control module does not receive the signal from the sensor. The first control module may determine a parameter while the second control module does not determine the parameter. The control modules of the vehicle may communicate via one or more serial data buses, such as a controller area network (CAN) bus. The control modules may communicate to, for example, share data that is received or determined by one control module but that is not received or determined by one or more other control modules.

SUMMARY

A system for a vehicle includes a message generation module, a queue manager module, and a communication control module. The message generation module generates a message that is to be transmitted to a serial data bus of the vehicle once per first predetermined period. The queue manager module resets a timer value when the message is added to a transmit queue and selectively adds the message to the transmit queue when: a number of messages in the transmit queue is less than a first predetermined value; the timer value is greater than the first predetermined period; and one of (i) the first predetermined period is less than a second predetermined period and (ii) the first predetermined period is greater than the second predetermined period and the number of messages in the transmit queue is less than a second predetermined value. The second predetermined value is less than the first predetermined value. The communication control module selectively transmits messages from the transmit queue to the serial data bus.

In other features, a system for a vehicle includes a message generation module, a timer module, a queue manager module, and a communication control module. The message generation module generates a message that is to be transmitted to a serial data bus of the vehicle once every first predetermined period. The timer module increments a timer value. The queue manager module resets the timer value when the message is added to a transmit queue. When a number of messages in the transmit queue is less than a predetermined value, the queue manager module selectively adds the message to the transmit queue based on: a first comparison of the timer value and the first predetermined period; and a second comparison of the first predetermined period and a second predetermined period. The communication control module selectively transmits messages from the transmit queue to the serial data bus.

A method for a vehicle includes: generating a message that is to be transmitted to a serial data bus of the vehicle once per first predetermined period; resetting a timer value when the message is added to a transmit queue; selectively adding the message to the transmit queue when: a number of messages in the transmit queue is less than a first predetermined value; the timer value is greater than the first predetermined period; and one of (i) the first predetermined period is less than a second predetermined period and (ii) the first predetermined period is greater than the second predetermined period and the number of messages in the transmit queue is less than a second predetermined value. The second predetermined value is less than the first predetermined value. The method further comprises selectively transmitting messages from the transmit queue to the serial data bus.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
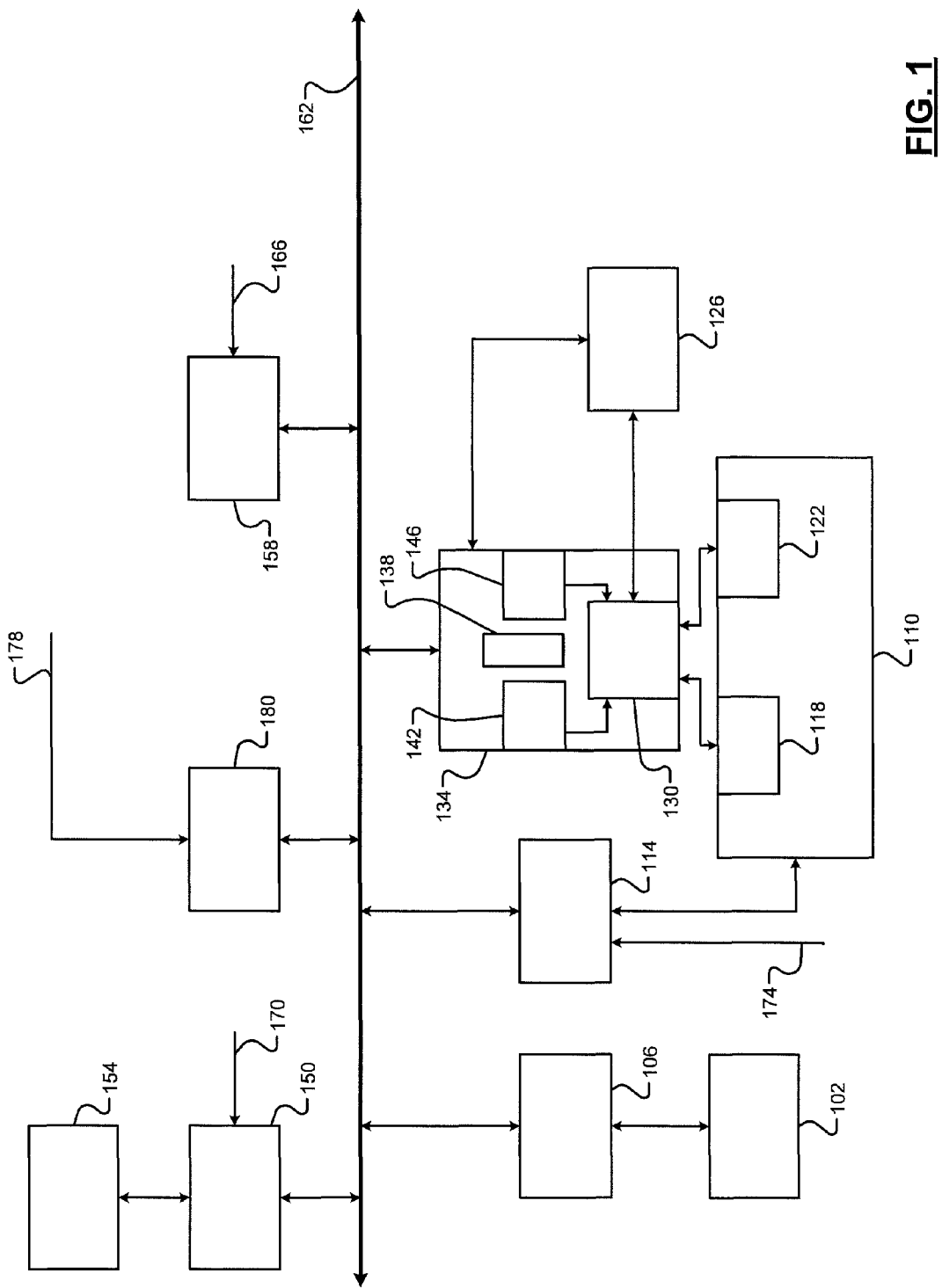
FIG. 1 is a functional block diagram of an example vehicle system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A control module of a vehicle generates a plurality of messages. Each of the messages is to be transmitted to a serial data bus of the vehicle at predetermined periods. For example only, a first message may be transmitted to the serial data bus at a first plurality of times that are each separated by a first predetermined period. A second message may be transmitted to the serial data bus at a second plurality of times that are each separated by a second predetermined period, and so on. Some of the predetermined periods may be the same, and some of the predetermined periods may be different. Accordingly, some messages may be transmitted to the serial data bus more frequently than others. The length of the predetermined periods may be set, for example, based on message content and other factors.

The control module selectively adds messages to a transmit queue. The control module selectively transmits messages that are in the transmit queue to the serial data bus. During a control loop, the control module determines whether to add one or more of the messages to the transmit queue.

Under some circumstances, however, the transmit queue may be full. The control module may skip adding one more messages to the transmit queue when the transmit queue is full. Another control module may indicate that a fault is present when the control module does not transmit a predetermined one of the messages to the serial data bus for a period.

When the transmit queue is not full, the control module according to the present disclosure determines whether to add a message to the transmit queue based on how frequently the message is to be transmitted to the serial data bus. When the message is to be transmitted to the serial data bus more often than a predetermined period, the control module adds the message to the transmit queue. When the message is to be transmitted to the serial data bus less often than the predetermined period, the control module adds the message to the transmit queue if the number of messages in the transmit queue is less than a predetermined value. The predetermined value is less than or equal to the number of messages that are in the transmit queue when the transmit queue is full.

Referring now to FIG. 1, a functional block diagram of an example distributed control system of a vehicle is presented. While a hybrid vehicle is shown and will be described, the present disclosure is also applicable to non-hybrid vehicles. An engine 102 combusts an air/fuel mixture to generate drive torque. An engine control module (ECM) 106 controls the engine 102.

The engine 102 may output torque to a transmission 110. A transmission control module (TCM) 114 controls operation of the transmission 110. For example only, the TCM 114 may control gear selection within the transmission 110 and one or more torque transfer devices (e.g., a torque converter, one or more clutches, etc.).

The transmission 110 may include one or more motors or motor generator units (MGUs). For example only, a first MGU (MGU-A) 118 and a second MGU (MGU-B) 122 may be included as in the example of FIG. 1. An MGU can act as either a generator or as a motor at a given time. When acting as a generator, an MGU converts mechanical energy into electrical energy. The electrical energy can be, for example, used to charge a battery 126 via a power control device 130. When acting as a motor, an MGU generates torque that may be used, for example, to supplement or replace torque output by the engine 102. In various implementations, a power control device may be provided for each MGU.

A power inverter control module (PIM) 134 may control the MGU-A 118, the MGU-B 122, and the power control device 130. The PIM 134 may be referred to as a transmission power inverter module (TPIM) or a traction power inverter module (TPIM) in various implementations. The PIM 134 may include a hybrid control processor (HCP) module 138, a first motor control processor (MCP-A) module 142, and a second motor control processor (MCP-B) module 146. The HCP module 138 may generate first and second torque requests for the MGU-A 118 and the MGU-B 122. The MCP-A module 142 and the MCP-B module 146 control the MGU-A 118 and the MGU-B 122 based on the first and second torque requests, respectively.

An electronic brake control module (EBCM) 150 may selectively control brakes 154 of the vehicle. A user interface module (UIM) 158 provides one or more driver inputs to a controller area network (CAN) bus 162. The CAN bus 162 may also be referred to as a car area network bus. The CAN bus 162 may be a serial data bus. The control modules of the vehicle may communicate with each other via the CAN bus 162.

The driver inputs may include, for example, an accelerator pedal position (APP) 166 and one or more other suitable driver inputs. A brake pedal position (BPP) 170 may be provided to the EBCM 150. A position 174 of a park, reverse, neutral, drive lever (PRNDL) may be provided to the TCM 114. The PRNDL position 174 may also be provided to the PIM 134 in various implementations. An ignition state 178 may be provided to a body control module 180. For example only, the ignition state 178 may be input by a driver via an ignition key, button, or switch. At a given time, the ignition state 178 may be one of off, accessory, run, or crank.

A vehicle may include one or more additional control modules that are not shown, such as a chassis control module, a battery pack control module, etc. One or more of the control modules may be omitted in various vehicles. The control modules may selectively transmit and receive data via the CAN bus 162. In various implementations, two or more control modules may communicate via one or more additional CAN buses (not shown).

Figure 2:
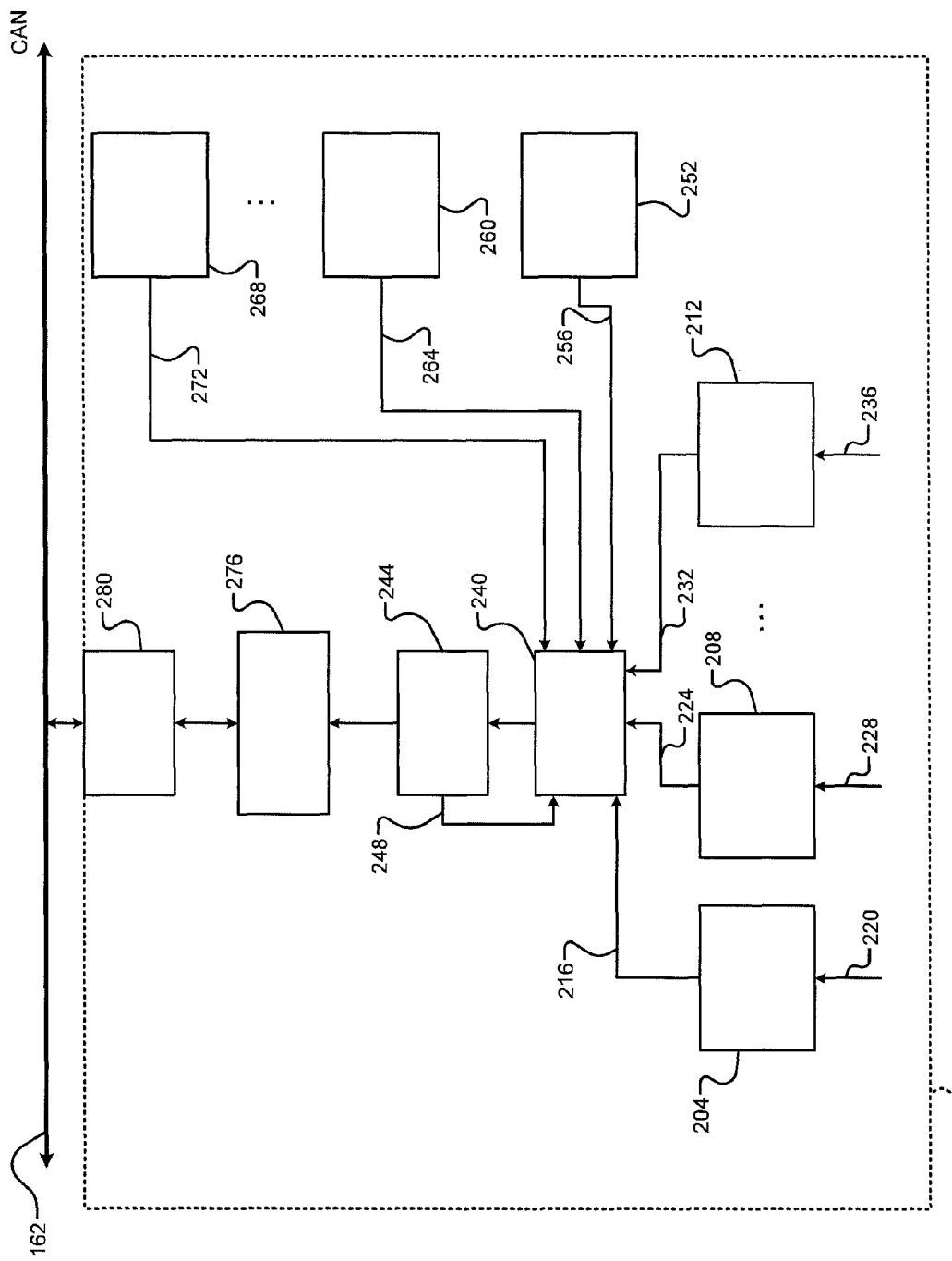
FIG. 2 is a functional block diagram of an example engine control module according to the present disclosure.

Referring now to FIG. 2, a functional block diagram of an example implementation of the ECM 106 is presented. While the present disclosure will be discussed in conjunction with the ECM 106, the present disclosure is also applicable to other control modules of a vehicle that transmit messages to a CAN bus.

The ECM 106 may include N message generation modules, where N is an integer greater than one. For example only, the ECM 106 may include a first message generation module 204, a second message generation module 208, ..., and an N-th message generation module 212.

The N message generation modules generate N messages, respectively, that are to be transmitted to the CAN BUS 162. The first message generation module 204 generates a first message 216 based on a first set of signals 220. The first message generation module 204 generates the first message 216 with a first predetermined message identifier (message ID) for the first message 216.

The second message generation module 208 generates a second message 224 based on a second set of signals 228. The second message generation module 208 generates the second message 224 with a second predetermined message ID for the second message 224. The N-th message generation module 212 generates an N-th message 232 based on an N-th set of signals 236. The N-th message generation module 212 generates the N-th message 232 with an N-th predetermined message ID for the N-th message 232. The first, second, ..., and N-th predetermined message IDs are different.

Each of the N messages is to be transmitted to the CAN BUS 162 once every predetermined period. For example only, the first message 216 is to be transmitted to the CAN BUS 162 once every first predetermined period. The second message 224 is to be transmitted to the CAN BUS 162 every second predetermined period. The N-th message 232 is to be transmitted to the CAN BUS 162 every N-th predetermined period.

One or more of the first, second, ..., and N-th predetermined periods may be the same, and one or more of the first, second, ..., and N-th predetermined periods may be different. The first, second, ..., and N-th predetermined periods may each be a multiple of a control loop period. For example only, the control loop period may be 25 milliseconds (ms) in various implementations. Multiples of the 25 ms control loop periods include 25 ms, 50 ms, 75 ms, 100 ms, 250 ms, 500 ms, 1000 ms, and other multiples of 25 ms.

A queue manager module 240 selectively adds one or more of the N messages to a transmit queue of a transmit queue module 244 when the transmit queue is not full. For example only, the transmit queue may include a first in first out (FIFO) buffer or another suitable type of transmit queue.

The transmit queue module 244 determines a number of messages 248 presently stored in the transmit queue and provides the number of messages 248 to the queue manager module 240. The transmit queue may be full, for example, when the number of messages 248 is greater than or equal to a first predetermined value. The transmit queue may be not full, for example, when the number of messages 248 is less than the first predetermined value. The first predetermined value may be an integer greater than one. For example only, the first predetermined value may be approximately 20 in various implementations.

During each control loop period, the queue manager module 240 evaluates whether to add the N messages to the transmit queue. The queue manager module 240 evaluates whether to add the N messages to the transmit queue in a predetermined order. For example only, the predetermined order may be the first message 216, the second message 224, ..., and the N-th message 232. The queue manager module 240 may repeat the predetermined order during a next control loop.

N timers are associated with the N messages, respectively. For example only, a first timer module 252 is associated with the first message 216. The first timer module 252 may include a first timer that increments a first timer value 256 as time passes. A second timer module 260 is associated with the second message 224. The second timer module 260 may include a second timer that increments a second timer value 264 as time passes. An N-th timer module 268 is associated with the N-th message 232. The N-th timer module 268 may include an N-th timer that increments an N-th timer value 272 as time passes.

The queue manager module 240 resets the timer value for a message when the message is added to the transmit queue. In this manner, the N timer values track the period that has passed since the N messages were last added to the transmit queue, respectively. For example only, the first timer value 256 tracks the period since the first message 216 was last added to the transmit queue.

The queue manager module 240 evaluates whether to add a message to the transmit queue based on whether the transmit queue is full, the predetermined period for the message, and the timer value for the message. The queue manager module 240 may determine the predetermined period for the message based on the message ID of the message. For example only, the queue manager module 240 may determine the predetermined period for the message from a mapping of predetermined periods indexed by message IDs. While the decision of whether to add the first message 216 to the transmit queue is provided below as an example, the queue manager module 240 may determine whether to add the other ones of the N messages similarly or identically.

The queue manager module 240 may determine whether to add the first message 216 to the transmit queue based on the first timer value 256, the first predetermined period, and whether the transmit queue is full. The queue manager module 240 may determine whether the first timer value 256 is greater than the first predetermined period. If the first timer value 256 is less than the first predetermined period, the queue manager module 240 may decide to not add the first message 216 to the transmit queue. If the first timer value 256 is greater than the first predetermined period, the queue manager module 240 may determine whether the transmit queue is full.

If the transmit queue is full, the queue manager module 240 may decide to not add the first message 216 to the transmit queue. If the transmit queue is not full, the queue manager module 240 may determine whether the first predetermined period is less than or equal to a predetermined high frequency message period. For example only, the predetermined high frequency message period may be approximately one, two, three, or four times the control loop period or another suitable value that is greater than a minimum one of the N predetermined periods and less than a maximum one of the N predetermined periods.

If the first predetermined period is less than or equal to the predetermined high frequency message period, the queue manager module 240 may add the first message 216 to the transmit queue. If the first predetermined period is greater than the predetermined high frequency message period, the queue manager module 240 may selectively add the first message 216 to the transmit queue based on the number of messages 248 in the transmit queue. For example only, the queue manager module 240 may add the first message 216 to the transmit queue when the number of messages 248 is less than a second predetermined value. When the number of messages 248 is greater than or equal to the second predetermined value, the queue manager module 240 may decide to not add the first message 216 to the transmit queue.

The second predetermined value is an integer that is greater than zero and that is less than the first predetermined value. The second predetermined value may be set to, for example, between approximately one-half and approximately three-quarters of the first predetermined value, inclusive. The second predetermined value is also greater than the number of the N predetermined periods that are less than or equal to the predetermined high frequency message period.

In sum, the queue manager module 240 may add a message to the transmit queue during a control loop when:
(i) the timer value for the message is greater than the predetermined period for the message;
(ii) the transmit queue is not full (e.g., the number of messages 248 is less than the first predetermined value); and
(iii) at least one of:
(a) the predetermined period for the message is less than or equal to the predetermined high frequency message period; and
(b) the number of messages 248 is less than the second predetermined value.

Otherwise, the queue manager module 240 may refrain from adding the message to the transmit queue during the control loop.

A communication control module 276 selectively transmits messages from the transmit queue to the CAN bus 162 via an input/output (I/O) interface 280. A message is removed from the transmit queue when the message is transmitted to the CAN bus 162. The communication control module 276 may perform arbitration when one or more other control modules attempts to transmit a message to the CAN bus 162 at the same time as the communication control module 276 is trying to transmit one or more message from the transmit queue to the CAN bus 162.

Figure 3:
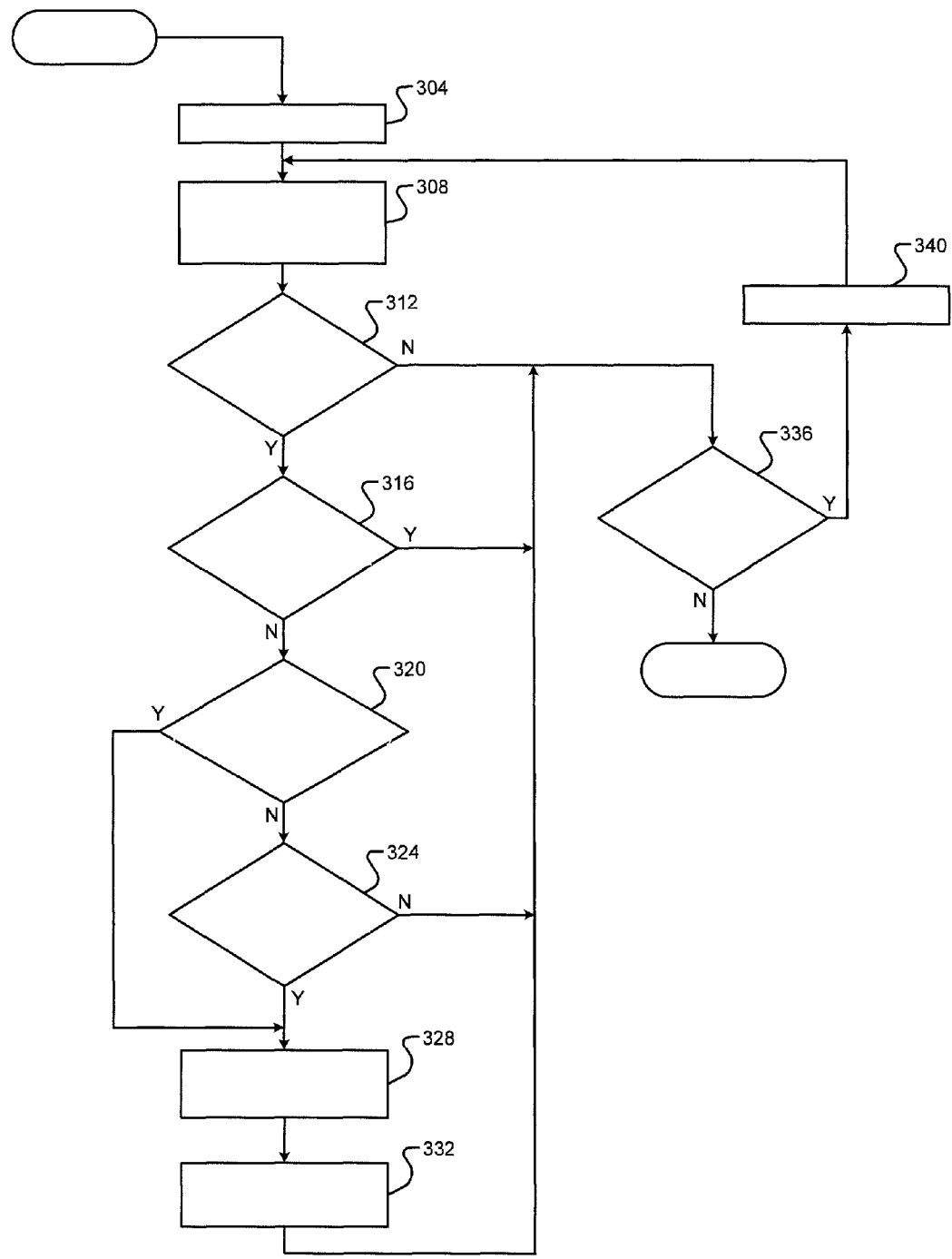
FIG. 3 is a flowchart depicting an example method of selectively adding messages to a transmit queue according to the present disclosure.

Referring now to FIG. 3, a flowchart depicting an example method of selectively adding ones of the N messages to the transmit queue is presented. Control may begin with 304 where control sets i=1. i may be an integer that is greater than zero and that is less than or equal to N.

At 308, control receives the i-th timer value and the i-th predetermined period associated with the i-th message (the i-th one of the N messages). Control may determine the i-th predetermined period, for example, based on the message ID of the i-th message. At 312, control determines whether the i-th timer value is greater than or equal to the i-th predetermined period. If true, control continues with 316; if false, control transfers to 336, which is discussed in detail below.

At 316, control determines whether the number of messages 248 presently in the transmit queue is equal to the first predetermined value. If true, the transmit queue is full, and control transfers to 336. If false, the transmit queue is not full, and control continues with 320. Control may determine whether the i-th predetermined period is less than or equal to the predetermined high frequency message period at 320. If true, control continues at 328, which is discussed in detail below. If false, control continues with 324.

At 324, control determines whether the number of messages 248 is less than the second predetermined value. If true, control continues with 328; if false, control transfers to 336. The second predetermined value is an integer that is less than or equal to the first predetermined value.

At 328, control places (adds) the i-th message in (to) the transmit queue. Control resets the i-th timer value to zero at 332, and control continues to 336. The i-th timer increments the i-th timer value as time passes, such that the i-th timer value tracks the period that has passed since control last added the i-th message to the transmit queue.

At 336, control determines whether i is less than N. If true, at least one of the N messages has not yet been evaluated for addition to the transmit queue during the present control loop, so control increments i (i=i+1) at 340 and control returns to 308. If false, each of the N messages has been evaluated for addition to the transmit queue during the present control lop, and control may end. Control may begin again at 304 during a next control loop.

Because the timer value of a message is only reset when the message is added to the transmit queue, if the message is not added during the present control loop due to, for example, the transmit queue being full or the number of messages 248 being greater than the second predetermined value, the message can be added during a next or future control loop. Allowing messages to be added during a next or future control loop may decrease the number of messages that are in the transmit queue at all times. When a message is added during a next or future control loop, the message will be offset from the control loop which it would have previously been added. The message being offset may help avoid encountering a situation where the transmit queue is full or high when the message is to be added to the transmit queue in the future. Allowing messages to be added during a next or future control loop may also decrease the portion of the CAN bus 162 (i.e., bandwidth) needed to transmit the messages in the transmit queue.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for a vehicle, comprising:
a message generation module that generates a message that is to be transmitted to a serial data bus of the vehicle once per first predetermined period;
a queue manager module that resets a timer value when the message is added to a transmit queue and that selectively adds the message to the transmit queue when:
a number of messages in the transmit queue is less than a first predetermined value;
the timer value is greater than the first predetermined period; and
one of:
the first predetermined period is less than a second predetermined period; and
the first predetermined period is greater than the second predetermined period and the number of messages in the transmit queue is less than a second predetermined value,
wherein the second predetermined value is less than the first predetermined value; and
a communication control module that selectively transmits messages from the transmit queue to the serial data bus.

2. The system of claim 1 further comprising a second message generation module that generates a second message that is to be transmitted to the serial data bus once per third predetermined period,
wherein the queue manager module selectively adds the second message to the transmit queue based on a second timer value, the number of messages in the transmit queue, the first predetermined value, the second predetermined period, the third predetermined period, and the second predetermined value.

3. The system of claim 2 wherein the queue manager module adds the second message to the transmit queue when:

the number of messages in the transmit queue is less than the first predetermined value;

the second timer value is greater than the third predetermined period; and one of:
- the third predetermined period is less than the second predetermined period; and
- the third predetermined period is greater than the second predetermined period and the number of messages in the transmit queue is less than the second predetermined value.

4. The system of claim 3 wherein the first and third predetermined periods are different.

5. The system of claim 3 wherein the first and third predetermined periods are multiples of a fourth predetermined period.

6. The system of claim 1 wherein message generation module generates the message with a message identifier that is unique to the message, and
wherein the queue manager module determines the first predetermined period based on the message identifier.

7. The system of claim 6 wherein the queue manager module determines the first predetermined period from a mapping of predetermined periods indexed by message identifier.

8. The system of claim 1 wherein the queue manager module selectively refrains from adding the message to the transmit queue when the first predetermined period is greater than the second predetermined period and the number of messages in the transmit queue is greater than the second predetermined value.

9. The system of claim 1 wherein the queue manager module refrains from adding the message to the transmit queue when the timer value is less than the first predetermined period.

10. The system of claim 1 wherein the queue manager module refrains from adding the message to the transmit queue when the number of messages in the transmit queue is one of greater than and equal to the first predetermined value.

11. A system for a vehicle, comprising:
- a message generation module that generates a message that is to be transmitted to a serial data bus of the vehicle once every first predetermined period;
- a timer module that increments a timer value;
- a queue manager module that resets the timer value when the message is added to a transmit queue and that, when a number of messages in the transmit queue is less than a predetermined value, selectively adds the message to the transmit queue based on:
  - a first comparison of the timer value and the first predetermined period; and
  - a second comparison of the first predetermined period and a second predetermined period; and
- a communication control module that selectively transmits messages from the transmit queue to the serial data bus.

12. A method for a vehicle, comprising:
- generating a message that is to be transmitted to a serial data bus of the vehicle once per first predetermined period;
- resetting a timer value when the message is added to a transmit queue;
- selectively adding the message to the transmit queue when:
  - a number of messages in the transmit queue is less than a first predetermined value;
  - the timer value is greater than the first predetermined period; and
  - one of:
    - the first predetermined period is less than a second predetermined period; and
    - the first predetermined period is greater than the second predetermined period and the number of messages in the transmit queue is less than a second predetermined value,
  - wherein the second predetermined value is less than the first predetermined value; and
- selectively transmitting messages from the transmit queue to the serial data bus.

13. The method of claim 12 further comprising:
- generating a second message that is to be transmitted to the serial data bus once per third predetermined period; and
- selectively adding the second message to the transmit queue based on a second timer value, the number of messages in the transmit queue, the first predetermined value, the second predetermined period, the third predetermined period, and the second predetermined value.

14. The method of claim 13 further comprising adding the second message to the transmit queue when:
- the number of messages in the transmit queue is less than the first predetermined value;
- the second timer value is greater than the third predetermined period; and
- one of:
  - the third predetermined period is less than the second predetermined period; and
  - the third predetermined period is greater than the second predetermined period and the number of messages in the transmit queue is less than the second predetermined value.

15. The method of claim 14 wherein the first and third predetermined periods are different.

16. The method of claim 14 wherein the first and third predetermined periods are multiples of a fourth predetermined period.

17. The method of claim 12 further comprising:
- generating the message with a message identifier that is unique to the message; and
- determining the first predetermined period based on the message identifier.

18. The method of claim 12 further comprising selectively refraining from adding the message to the transmit queue when the first predetermined period is greater than the second predetermined period and the number of messages in the transmit queue is greater than the second predetermined value.

19. The method of claim 12 further comprising refraining from adding the message to the transmit queue when the timer value is less than the first predetermined period.

20. The method of claim 12 further comprising refraining from adding the message to the transmit queue when the number of messages in the transmit queue is one of greater than and equal to the first predetermined value.

* * * * *